Nov. 21, 1933.　　　　F. J. SINGER　　　　1,935,750
TELEGRAPH SYSTEM
Filed Oct. 22, 1932
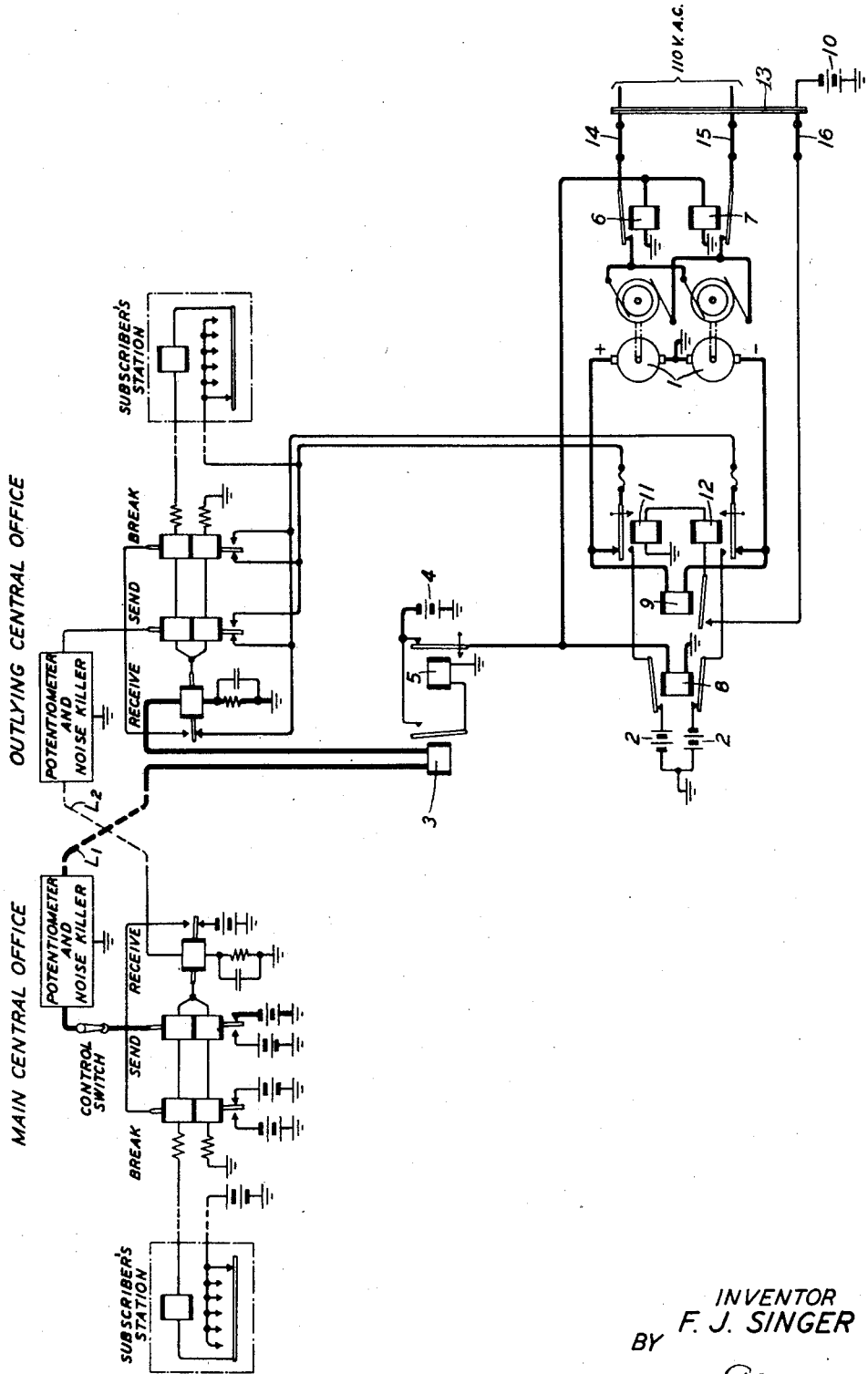
INVENTOR
F. J. SINGER
BY
ATTORNEY Patented Nov. 21, 1933

1,935,750

UNITED STATES PATENT OFFICE 1,935,750

TELEGRAPH SYSTEM

Fred J. Singer, Rockville Center, N. Y., assignor to American Telephone and Telegraph Company, a corporation of New York Application October 22, 1932. Serial No. 639,058

11 Claims. (Cl. 178—2)

This invention relates to improvements in telegraph systems, and more particularly to those systems in which repeater stations are arranged for remote control.

The invention is described herein as embodied in a printing telegraph system, but its scope is not to be restricted thereto, because it is applicable, in general, to any telegraph system.

It may be stated by way of introduction that printing telegraph systems often comprise a large central office for transmitting information to a plurality of small outlying central offices which, in turn, transmit information to a plurality of subscribers' stations. Each of the small central offices, or repeater stations, usually has one or more motor generators and a source of power supply connected thereto for operating the motor generator or generators. Each repeater station also usually has an emergency battery supply which is used to supply the motor generator in the event of a failure of the power supply. Since many of these repeater stations are only used about eight hours of the day, it is desirable for economic reasons to stop their motor generators during periods of non-use. It is also economically desirable to disconnect their power supplies and to conserve their emergency battery supplies during idle periods. Many such repeater stations are often unattended because they are located at such a distance from the central office that it is impractical to have an attendant sent out from the central office to perform the above operations. Therefore, it is desirable that an operator at the central office be able to perform the above operations at unattended repeater stations.

It is an object of this invention to provide a simple and inexpensive method of remotely controlling from a central office the operation of the motor generators at unattended repeater stations.

Another object of this invention is to enable an operator at a central office to connect or disconnect the power supplies at unattended repeater stations.

Still another object of this invention is to enable an operator at a central office to connect or disconnect the emergency battery supplies at unattended repeater stations.

In accordance with this invention, the power supply and emergency battery supply at an unattended repeater station may be connected to the motor generator at that station and the motor generator may be started automatically in response to a closed condition of the telegraph line. The power supply and the emergency battery supply may be disconnected from the motor generator at an unattended repeater station and the motor generator may be stopped automatically in response to an open condition of the telegraph line in excess of a predetermined period.

The invention will now be explained with reference to the drawing which illustrates the application of the invention to a two-path polar telegraph system of a well-known type. It should be understood that the following description is given for the purpose of explaining one application of the invention and that the invention is not to be restricted in its application to a two-path polar telegraph system but is capable of application to other types of systems.

This system comprises a main central office to which is connected a subscriber's station and an outlying central office. For the sake of simplicity in the drawing, only one subscriber's station and outlying central office have been shown. However, in actual practice, there would be a plurality of subscribers' stations and outlying central offices similarly connected to the main central office. Likewise, only one subscriber's station is shown connected to the outlying central office whereas, in reality, there might be a plurality of them. It will be noted that the outlying central office utilizes motor generators 1 which are operated by an ordinary 110-volt alternating current power supply as shown in the drawing. In the event of a failure in the power supply, emergency battery supply 2—2 is automatically switched into circuit so that transmission may proceed without interruption.

The operation of this system without the addition of the invention need not be described here because it is familiar to those skilled in the art. It is sufficient to say that the subscriber's station shown at the left of the drawing can transmit information to the subscriber's station at the right by means of transmission line $L_1$. Similarly, the subscriber's station at the right can transmit information to the subscriber's station at the left by means of line $L_2$.

With the addition of the invention to this system, signal impulses transmitted from the subscriber's station at the left will pass through the main central office and out over line $L_1$ to relay 3 at the outlying central office. From relay 3, the signal impulses will pass through the regular apparatus at the outlying central office and then to the subscriber's station at the right. As this is a polar system, the signals comprise current reversals. Since relay 3 is not a polar relay, it will be continually operated during this time except for brief moments when the current reverses in polarity.

While relay 3 remains operated, current from battery 4 will pass through the armature of non-operated relay 5 and will operate relays 6, 7 and 8. It can be seen that when relay 3 becomes non-operated, its armature will close a path from battery 4 through relay 5 to ground. This would operate relay 5 and cause relays 6, 7 and 8 to become non-operated. Therefore, relay 5 is designed to be slow in operating so that it will not be unintentionally operated by the momentary de-energization of relay 3 during current reversals and line hits.

The operation of relays 6 and 7 serves to connect the 110-volt alternating current power supply to motor generators 1. This will cause the operation of motor generators 1 which will supply voltage to the central office load and which will also operate relay 9.

In the event of a failure in the 110-volt alternating current power supply, the operation of relays 6 and 7 will not now cause the operation of motor generators 1. Since there is now no voltage being supplied to the central office load, relay 9 will become non-operated. A path will now be closed from battery 10 through the armature of relay 9, and through relays 11 and 12 to ground. This will cause the operation of relays 11 and 12 which, in operating, will close a path from emergency battery supply 2—2 through the armatures of operated relay 8 and through the armatures of relays 11 and 12 to the central office load.

A switch 13 has been provided in case someone, such as a maintenance man, wishes to stop the motor generators 1 and to cut off both the 110-volt alternating current power supply and emergency battery supply 2. It can be seen from the drawing that the two upper blades 14 and 15 of switch 13 disconnect the 110-volt A. C. power supply while the bottom blade 16 cuts off battery 10 thereby preventing emergency battery supply 2 from being utilized when relay 9 becomes non-operated.

When switch 13 is closed after having been opened, relay 9 will not immediately be operated because motor generators 1 will not come immediately to operating speed. This delay would probably be sufficient for battery 10 to operate relays 11 and 12 thereby connecting emergency battery supply 2 to the central office load. Then, as soon as sufficient voltage is supplied to relay 9 from motor-generators 1, relay 9 would operate and open the energizing circuit of relays 11 and 12. This procedure may be obviated by making relays 11 and 12 slow to operate and to have an operating delay which is greater than the time required for motor generators 1 to attain their full operating speed.

At the close of the business day, the operator at the main central office, will wish to stop motor generators 1 and to disconnect both the 110-volt A. C. power supply and emergency battery supply 2—2 at the outlying central office. To perform these operations, the operator at the main central office will open line $L_1$ by manually operating the control switch at the main central office.

The opening of line $L_1$ will cause relay 3 to become non-operated and to remain so until line $L_1$ is closed by the closure of the control switch.

Current from battery 4 will now pass through the armature of relay 3 and operate relay 5.

Since relay 3 now remains non-operated for a period longer than the delay of relay 5, relay 5 will operate. The operation of relay 5 opens the path from battery 4 to relays 6, 7 and 8 so that relays 6, 7 and 8 now become non-operated.

When relays 6 and 7 become non-operated, their armatures fall away thereby opening the path from the 110-volt A. C. power supply to motor generators 1. Accordingly, motor generators 1 will stop and will discontinue supplying voltage to the outlying central office load.

It has been stated above that, when motor generators 1 stop, relay 9 will become non-operated thereby closing the path for battery 10 to operate relays 11 and 12. It has also been stated that the operation of relays 11 and 12 will close a path from emergency battery supply 2—2, through the armatures of operated relay 8, and through the armatures of relays 11 and 12 to the central office load.

However, now that relays 3, 6 and 7 are non-operated, relay 8 is also non-operated. In becoming non-operated, relay 8 releases its armatures thereby opening the path from emergency battery supply 2—2 to the central office load.

For the sake of simplicity in the drawing, only one outlying central office has been shown connected to the main central office. In actual practice several outlying central offices might be similarly connected to the main central office. There would be an individual control switch at the main central office for each of the outlying central offices so that the operator at the main central office could individually control each outlying central office.

At the beginning of the next business day, the operator at the main central office will wish to connect the 110-volt A. C. power supply, emergency battery supply 2—2, and start motor-generators 1 at the outlying central office. To do this, the operator closes the control switch thereby applying battery to line $L_1$ and operating relay 3. The operation of relay 3 will break the energizing circuit for relay 5 thereby causing relay 5 to become non-operated. When relay 5 releases, an energizing circuit for relays 6, 7 and 8 is closed. The operation of relays 6 and 7 connect the 110-volt A. C. power supply to motor generator 1 as has been described above. The operation of relay 8 connects emergency battery supply 2 to the contacts of relays 11 and 12 as has also been described above.

In this manner, the operator at the main central office can control motor generators 1, 110-volt A. C. power supply, and emergency battery supply 2—2 at an outlying central office.

This use of the invention is illustrative of its operation and will serve to assist in interpreting the claims. The claims are not to be restricted to the precise construction described above, but are intended to include all changes and modifications employing the principles and features of operation of the invention.

What is claimed is:

1. A communication system comprising in combination a first central office, a second central office, a transmission line connecting the first central office to the second central office, a power supply path at the second central office, an emergency battery supply path at the second central office, and instrumentalities at the second central office for closing the paths of the power supply and emergency battery supply in response to a closed condition of the transmission line.

2. A communication system comprising in combination a first central office, a second central office, a transmission line connecting the first central office to the second central office, a power supply path at the second central office, an emergency battery supply path at the second central office, and instrumentalities at the second central office for opening the paths of the power supply and emergency battery supply in response to an open condition of the transmission line in excess of a predetermined period.

3. A communication system comprising in combination a central office, a repeater station, a transmission line connecting the central office to the repeater station, a power supply path at the repeater station, an emergency battery supply path at the repeater station, and instrumentalities at the repeater station for closing the paths of the power supply and emergency battery supply in response to a closed condition of the transmission line, said instrumentalities also being responsive to an open condition of the line in excess of a predetermined period for opening the path of the power supply and emergency battery supply.

4. A communication system comprising in combination a central office, a repeater station, a normally open transmission line connecting the repeater station to the central office for the transmission of signal impulses, a motor generator at the repeater station, and instrumentalities also at the repeater station for starting the motor generator in response to a closure of the transmission line by an operator at the central office.

5. A communication system comprising in combination a central office, a repeater station, a normally open transmission line connecting the repeater station to the central office for the transmission of signal impulses, a motor generator at the repeater station, and instrumentalities also at the repeater station for stopping the motor generator after it has been started, said instrumentalities operating in response to an opening of the line in excess of a predetermined period by an operator at the central office.

6. A communication system comprising in combination a central office, a repeater station, a normally open transmission line connecting the repeater station to the central office for the transmission of signal impulses, a motor generator at the repeater station, and instrumentalities also at the repeater station for starting the motor generator in response to a closure of the transmission line by an operator at the central office and for stopping the motor generator after it has been started, the stopping being performed in response to an opening of the line in excess of a predetermined period by an operator at the central office.

7. A communication system comprising in combination a central office, a repeater station, a normally open transmission line connecting the repeater station to the central office for the transmission of signal impulses, a motor generator at the repeater station, a source of power supply also at the repeater station, instrumentalities located at the repeater station for connecting the power supply to the motor generator, and control means for controlling the operation of said instrumentalities, said control means being responsive to a closure of the transmission line for operating said instrumentalities and to an opening of the line in excess of a predetermined period for rendering said instrumentalities non-operative, said closure and opening being performed by an operator at the central office.

8. A printing telegraph system comprising in combination a printing telegraph central office, a printing telegraph repeater station, a transmission line connecting the printing telegraph central office to the printing telegraph repeater station for the transmission of signal impulses, a power supply path at the printing telegraph repeater station, an emergency battery supply path at the repeater station, and instrumentalities at the repeater station for closing the paths of the power supply and emergency battery supply in response to a closure of the transmission line by an operator at the central office.

9. A printing telegraph system comprising in combination a printing telegraph central office, a printing telegraph repeater station, a transmission line connecting the printing telegraph central office to the printing telegraph repeater station for the transmission of signal impulses, a power supply path at the printing telegraph repeater station, an emergency battery supply path at the repeater station, and instrumentalities at the repeater station for opening the paths of the power supply and emergency battery supply in response to an opening of the transmission line in excess of a predetermined period by an operator at the central office.

10. A printing telegraph system comprising in combination a first subscriber's printing telegraph station connected to a printing telegraph central office by a first transmission line for the transmission of signal impulses, a second subscriber's printing telegraph station connected to a printing telegraph repeater station by a second transmission line for the transmission of signal impulses, a normally open third transmission line connecting the repeater station to the central office for the transmission of signal impulses, a normally idle motor generator at the repeater station, and instrumentalities at the repeater station for starting the motor generator in response to a closure of the normally open third transmission line by an operator at the central office.

11. A printing telegraph system comprising in combination a first subscriber's printing telegraph station connected to a printing telegraph central office by a first transmission line for the transmission of signal impulses, a second subscriber's printing telegraph station connected to a printing telegraph repeater station by a second transmission line for the transmission of signal impulses, a normally open third transmission line connecting the repeater station to the central office for the transmission of signal impulses, a normally idle motor generator at the repeater station, and instrumentalities at the repeater station for stopping the motor generator after it has been started, the stopping being performed in response to an opening of the third transmission line in excess of a predetermined period by an operator at the central office.

FRED J. SINGER.